(12) United States Patent
Cherevatsky

(10) Patent No.: US 8,499,543 B2
(45) Date of Patent: Aug. 6, 2013

(54) CASING FOR INSENSITIVE MUNITIONS AND PROCESS FOR MAKING SAME

(75) Inventor: Abel Cherevatsky, Modiin, IL (US)

(73) Assignee: Israel Military Industries Ltd., Ramat Harsharon (IL)

( * ) Notice: Subject to any disclaimer, the term of this patent is extended or adjusted under 35 U.S.C. 154(b) by 239 days.

(21) Appl. No.: 12/740,199

(22) PCT Filed: Oct. 23, 2008

(86) PCT No.: PCT/IL2008/001400
§ 371 (c)(1),
(2), (4) Date: Apr. 28, 2010

(87) PCT Pub. No.: WO2009/057100
PCT Pub. Date: May 7, 2009

(65) Prior Publication Data
US 2010/0251920 A1     Oct. 7, 2010

(30) Foreign Application Priority Data
Oct. 28, 2007  (IL) .......................................... 186966

(51) Int. Cl.
*F02K 9/62*       (2006.01)

(52) U.S. Cl.
USPC ............................ 60/223; 102/481; 428/34.7

(58) Field of Classification Search
USPC ..................... 102/331, 481; 60/223; 428/34.7
See application file for complete search history.

(56) References Cited

U.S. PATENT DOCUMENTS

| | | | |
|---|---|---|---|
| 3,490,983 A * | 1/1970 | Lee ................................ | 428/113 |
| 3,665,857 A | 5/1972 | Radnich et al. | |
| 4,494,373 A | 1/1985 | Vetter et al. | |
| 5,035,182 A * | 7/1991 | Purcell et al. ................. | 102/481 |
| 5,044,154 A | 9/1991 | English, Jr. et al. | |
| 5,170,007 A | 12/1992 | Figge, Sr. | |
| 5,369,955 A * | 12/1994 | VanName et al. .............. | 60/253 |
| 5,763,027 A | 6/1998 | Enders et al. | |
| 5,976,293 A | 11/1999 | Olander et al. | |
| 6,038,979 A | 3/2000 | Watson et al. | |
| 6,148,606 A * | 11/2000 | Grossi et al. .................... | 60/223 |
| 6,386,110 B1 | 5/2002 | Landman et al. | |
| 6,904,755 B2 * | 6/2005 | Canfield et al. ................. | 60/770 |

* cited by examiner

*Primary Examiner* — Stephen M Johnson
(74) *Attorney, Agent, or Firm* — Harness, Dickey & Pierce, P.L.C.

(57) ABSTRACT

An insensitive munitions casing, such as a motor case, for housing a propellant charge is disclosed. The casing is formed by winding, wrapping or rolling a fiber, tape or sheet of material such that the casing has a plurality of reinforcing layers. At least some of the reinforcing layers have discontinuous interfaces. Other reinforcing layers may overlap the discontinuous interfaces. The reinforcing layers are coated with adhesive bonding material for adhering the reinforcing layer to itself and bonding the discontinuous interfaces. The adhesive bonding material has a bond-strength breakdown temperature which is below the auto-ignition temperature of the propellant charge. Once the bond strength breakdown temperature of the adhesive is reached, the bond fails at the discontinuous interface, thereby enabling release of propellant charge pressurization.

16 Claims, 4 Drawing Sheets

CASING FOR INSENSITIVE MUNITIONS AND PROCESS FOR MAKING SAME

FIELD OF INVENTION

The present invention relates to a composite motor case and, more particularly, to a case munitions motor that is constructed to structurally degrade when exposed to an abnormally high temperature below the auto-ignition temperature of an encased propellant.

BACKGROUND OF THE INVENTION

The destructive capability of explosive munitions is intended to be directed against an aggressor. However, this same lethal and/or damaging potential can result in the loss of manpower and capability of our own forces in the event that the munitions is mishandled, subject to fuel fire and/or cook-off conditions, or projectile and/or shock scenarios. Furthermore, the propagation of the damaging reaction from the initiating munitions to adjacent material and munitions can greatly enhance the severity of damage.

Various munitions motor cases provided with fire exposure safety features are known in the patented prior art.

U.S. Pat. No. 3,665,857 discloses a rocket motor case provided with a safety ejection plug which is sealed to the case by a sealant having a melting temperature lower than that of the auto-ignition temperature of the encased projectile charge, to enable the plug to be ejected from the case for pressure release when exposed to dangerously high temperature.

U.S. Pat. No. 4,494,373 discloses a rocket motor case having a cook-off safety feature, wherein selected portions of the case are structurally strengthened and thermally protected while other selected stress points in the case are left unprotected, thereby causing the case to rupture at the unprotected points for pressure venting if the case is exposed to abnormally high temperatures.

U.S. Pat. No. 5,170,007 discloses a roll-bonded, insensitive munitions motor case and method of production. The motor case comprises a sheet of fiber reinforced thermoplastic, thermoset or other suitable material rolled to form a case with a tubular configuration having at least one layer of material, and a coating of adhesive on at least part of the sheet for bonding the sheet to itself for maintaining the tubular configuration. The adhesive has a bond-strength breakdown temperature which is below the auto-ignition temperature of the housed propellant, thereby enabling the case to separate and un-roll when the breakdown temperature is reached to preclude dangerous propellant pressurization within the case. The method of production includes the steps of applying an adhesive to the sheet, rolling the sheet around a cylindrical tool to form a tubular case having at least one layer, and curing the case. Preferably the case is cured while on a tool which has a coefficient of thermal expansion which is greater than that of the sheet to ease removal of the case upon cooling. The casing sheet may be rolled such that there is a longitudinal section which has one less layer of material than the remainder of the case, whereby the case would fail along that longitudinal section if over-pressurization should occur.

U.S. Pat. No. 5,976,293 discloses a dimensionally stable Insensitive Munitions case for supporting and controllably combusting propellant and/or gas-generating combustion gases. The case is permeable to the combustion gases produced at temperatures above ambient temperature but below the auto-ignition temperature of the propellant and/or gas-generating supported therein. The case is dimensionally stable without the use of metals, alloys or the like that yield shrapnel upon explosion in the barrel section of the case.

U.S. Pat. No. 6,038,979 describes a process and material for forming a warhead casing. The material consists of tightly wound carbon fiber bonded by a room temperature curing resin. The process eases and speeds manufacturing and eliminates the need to do inside threading as the interior of the casing can be totally formed during winding of the carbon thread.

U.S. Pat. No. 6,386,110 provides a deforming charge assembly which has co-axially arranged inner and outer cylinders formed from carbon fiber. Each cylinder has a first layer of circumferentially wound carbon fiber, a second layer of unidirectional carbon fiber sheet and a plurality of layers of carbon fibers circumferentially wrapped around the second layer. Detonation barrier members are disposed between the inner and outer cylinders and bolted to the cylinders on the wrapping machine.

While the prior art motor cases enable some protection against dangerous propellant pressurization, they can be difficult and expensive to manufacture, and often do not provide adequate venting to insure safe release of the propellant energy.

Therefore, a need has been created for an economical, reliable and tailorable munitions case which provides the necessary structural integrity under normal conditions essential to its primary mission, while allowing structural degradation when the case reaches a predetermined, abnormal elevated temperature which is below the auto-ignition temperature of the encased propellant, thereby precluding dangerous propellant pressurization within the case. The motor case and method of production of the present invention meet this need.

SUMMARY OF THE INVENTION

Accordingly, a primary object of the present invention is to provide a tailored, economical and reliable insensitive munitions motor case that will lose its structural integrity upon reaching a predetermined temperature which is below the auto-ignition temperature of the housed propellant, thereby rendering the case incapable of sustaining sufficient internal pressure to destructively detonate the case.

Another object of the invention is to provide a method for manufacturing such an insensitive munitions motor case.

In accordance with the present invention there is provided an insensitive munitions (IM) casing, such as a motor case, for housing a propellant charge, said casing comprising, a reinforcing fiber, tape or sheet of composite material wound, wrapped or rolled respectively, to form a case having a number of composite layers, said reinforcing fiber, tape or sheet composite material being coated with adhesive bonding material for bonding the reinforcing fiber, tape or sheet to itself for constructing and maintaining the configuration of the composite case, said adhesive having a bond-strength breakdown temperature which is below the auto-ignition temperature of the housed propellant, characterized in that at least some of the wound, wrapped or rolled composite layers are discontinuous, thereby enabling the discontinuous sections to lose their strength and separate once the bond strength breakdown temperature of the adhesive is reached causing the case to fail at the discontinuous interface thereby releasing internal pressure in the case and preventing dangerous propellant pressurization within the case.

Another aspect of the present invention there is provided an insensitive munitions (IM) casing wherein the at least some of the reinforcing fiber, tape or sheet composite layer that is discontinuous overlaps, thereby bonding the composite layer to itself and prevent separation of the discontinuous layers below the bond strength breakdown temperature of the adhesive due to the overlap.

Yet another aspect of the present invention is to provide an insensitive munitions (IM) casing wherein the interface of the discontinuous sections is covered with a patch of adhesive coated reinforcing material, said adhesive having a bond strength breakdown temperature below the auto-ignition temperature of the housed propellant, said patch bonds the discontinuous sections and prevents separation of the discontinuous layers below the bond strength breakdown temperature of the adhesive.

A still further aspect of the invention is to provide an efficient and economical method of manufacturing a composite IM motor case from reinforcing fiber, tape or sheet material, coated with an adhesive having a bond strength breakdown temperature below the auto-ignition temperature of a housed propellant, comprising, winding, wrapping or rolling the adhesive coated reinforcing fiber, tape or sheet material around a mandrel to form at least one layer of material, making at least part of some of the layers discontinuous, and curing the case.

Yet another object of the invention is to provide a method of manufacturing a composite IM motor case as described above, where the discontinuous layers either overlap or are covered with an adhesive coated composite patch material.

The method may include providing a gap between the mandrel and the case after cool-down to facilitate easy removal of the case from the mandrel. The term fiber in the specification and claims is used to denote a fiber which itself comprises one or more filaments and may have various forms, such as braided fibers or woven fibers. The term tape in the specification and claims is used to denote a flat strip of made from fibers as is understood in the art.

Examples of appropriate reinforcing material from which the fiber, tape or sheet can be produced include, but are not limited to, graphite, fiberglass, silica, polyaramide, quartz and the like. Preferably, the fibers are pre-preg fibers of thermoplastic or thermosetting adhesives.

The present invention has some of the following advantages:

1. By virtue of the pre-selected discontinuity of the composite layered material it readily enables venting of a munitions casing to release excessive internal pressure prior to any contained propellant reaching the auto-ignition temperature.

2. by using filament winding, the casing can be easily made in a variety of forms—i.e. not limited to only a tubular form, as when making the casings from sheets; and 3. The level and location of the discontinuity can be controlled to meet different requirements for casings. This is accomplished by varying the length and place of the overlap or the size of the patch which will depend on the tensile strength of the fiber.

BRIEF DESCRIPTION OF THE DRAWINGS

The invention may be more clearly understood upon reading of the following detailed description of non-limiting exemplary embodiments thereof, with reference to the following drawings, in which.

DETAILED DESCRIPTION OF THE INVENTION

Figures 1, 2:
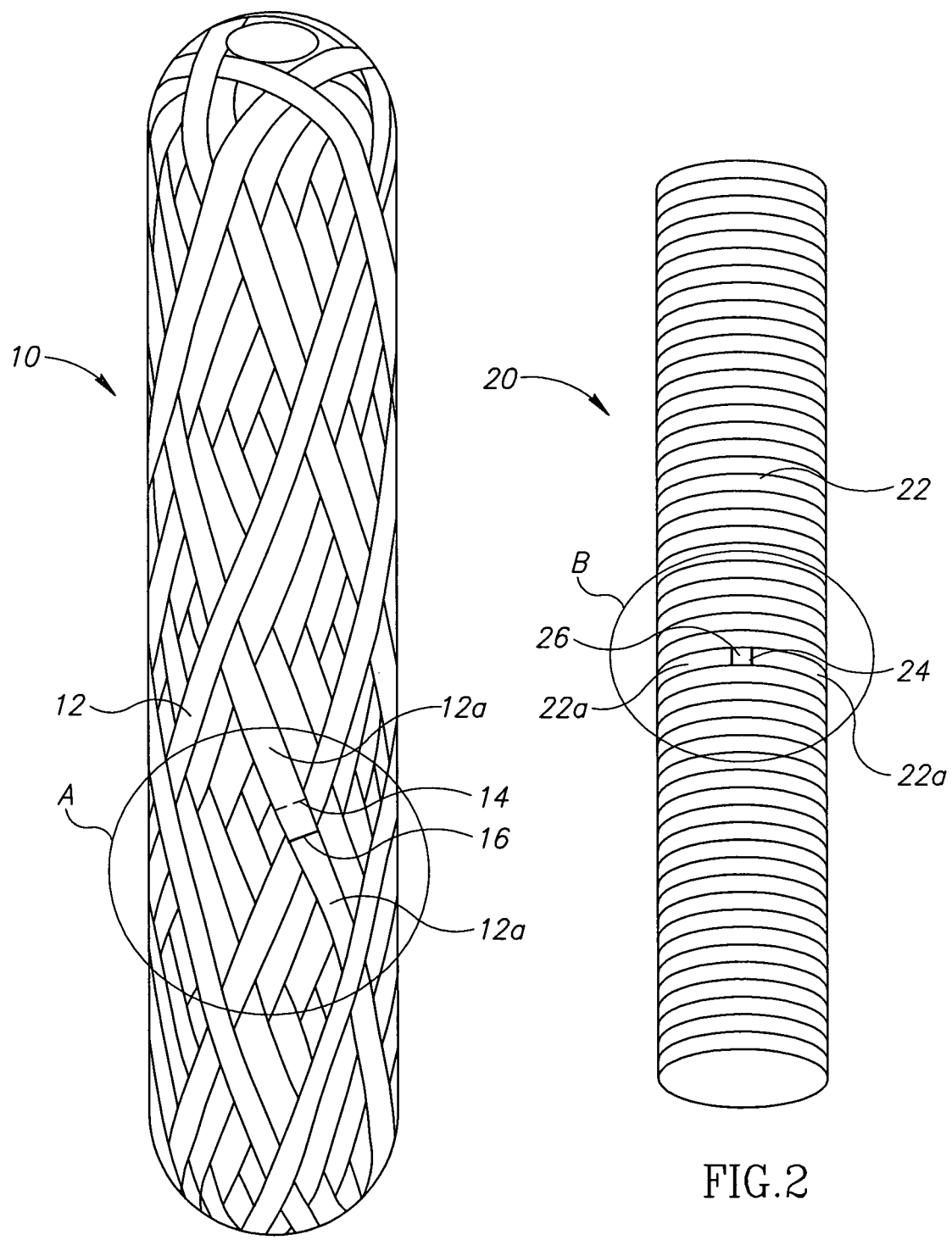
FIG. 1 illustrates an insensitive munitions casing of the present invention.
FIG. 2 illustrates another embodiment of the invention.
Figure 1A:
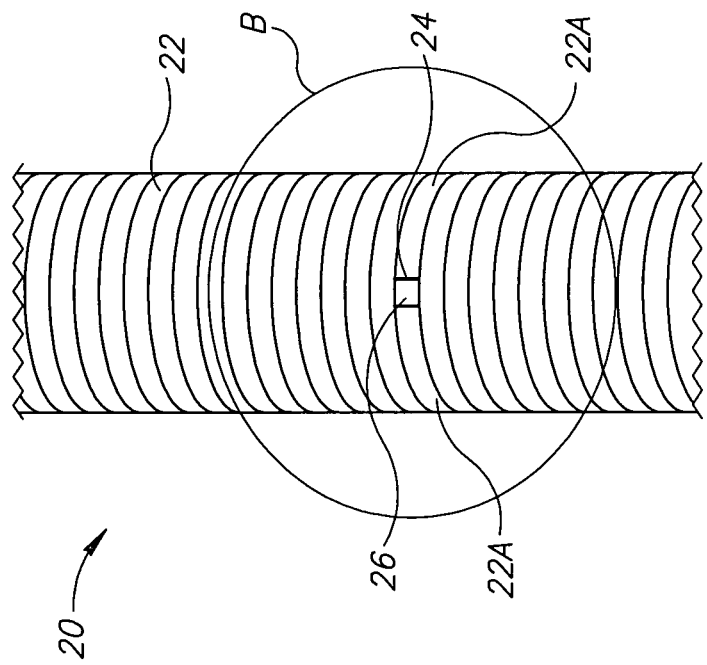
FIG. 1A is a blow up of section A of FIG. 1.

Referring first to FIGS. 1 and 1A, there is shown an embodiment of an Insensitive Munitions (IM) casing of the present invention. The casing 10 has helically wound reinforcing tape 12. The tape section 12a is cut at 14 and the winding is continued with the rest of the tape 12a overlapping 16 the cut 14 to form a discontinuous section.

Figure 2A:
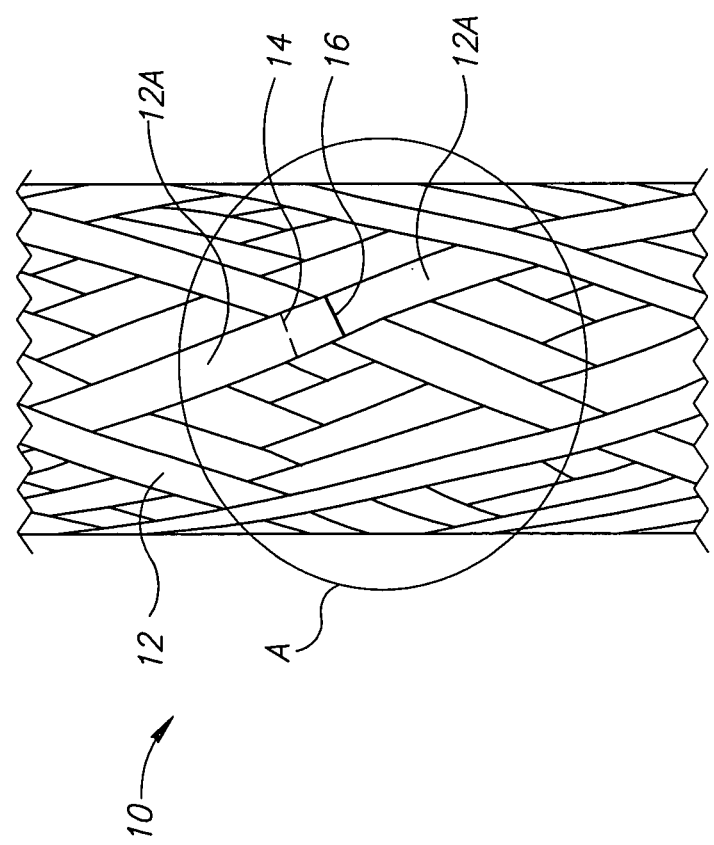
FIG. 2A is a blow up of section B of FIG. 2.

FIGS. 2 and 2A illustrate another casing 20 where the reinforcing tape 22 is wound circumferentially. Tape section 22a is cut at 24 and the winding continued with overlap 26 to form a discontinuous section.

Figure 3:
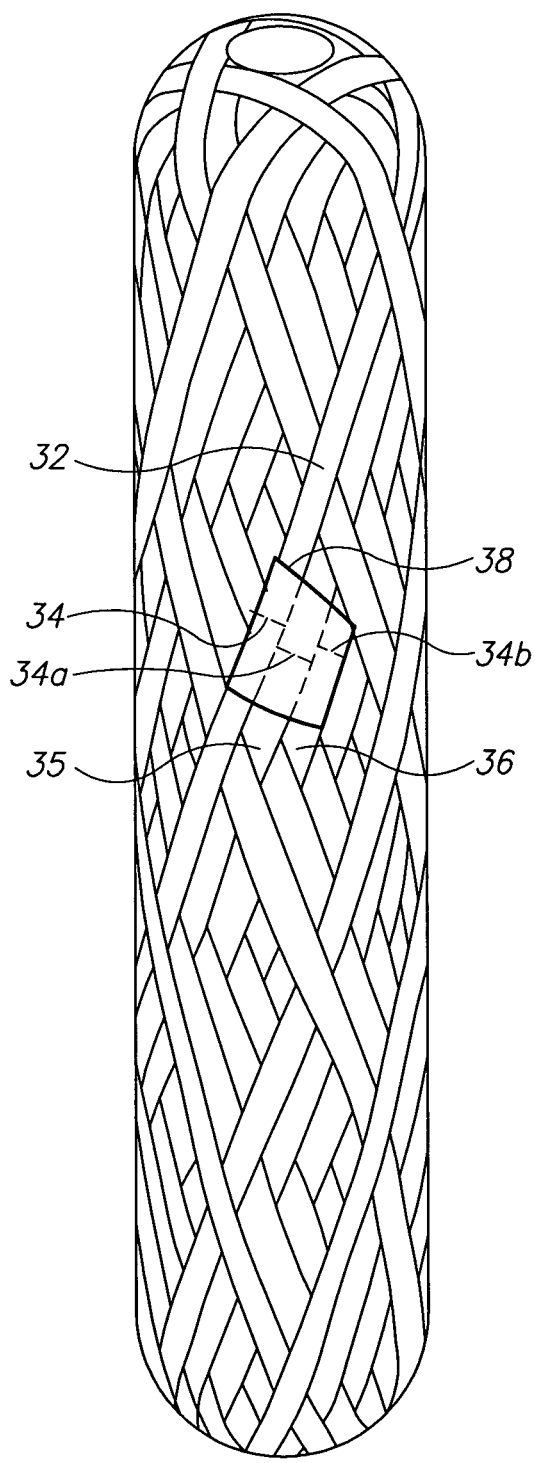
FIG. 3 illustrates still another embodiment of preparing a casing of the present invention, FIG. 4 show still another embodiment of preparing a casing of the present invention.

FIG. 3 shows an IM casing as in FIG. 1 but wherein a patch 38 is placed over the multiple cuts 34, 34a and 34b in tapes 32, 35 and 36 covering and adhering the discontinuous strips of tape together.

Figure 4:
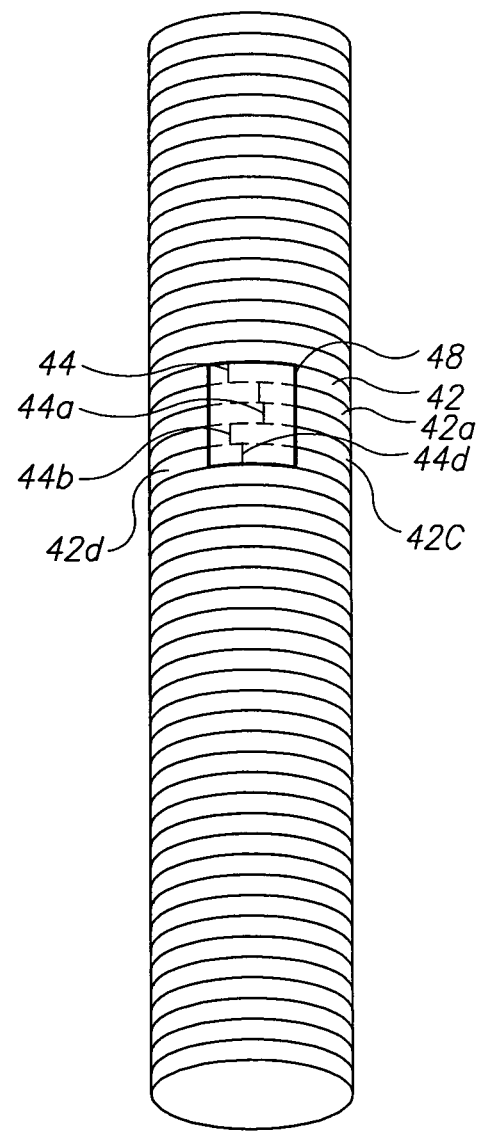

FIG. 4 show still another embodiment of an IM casing similar to that of FIG. 2, but wherein a patch 48 is placed over the multiple cuts 44, 44a, 44b, 44c and 44d, covering and adhering the discontinuous sections of tapes 42, P 42a, 42b, 42c and 42d.

Figure 5:
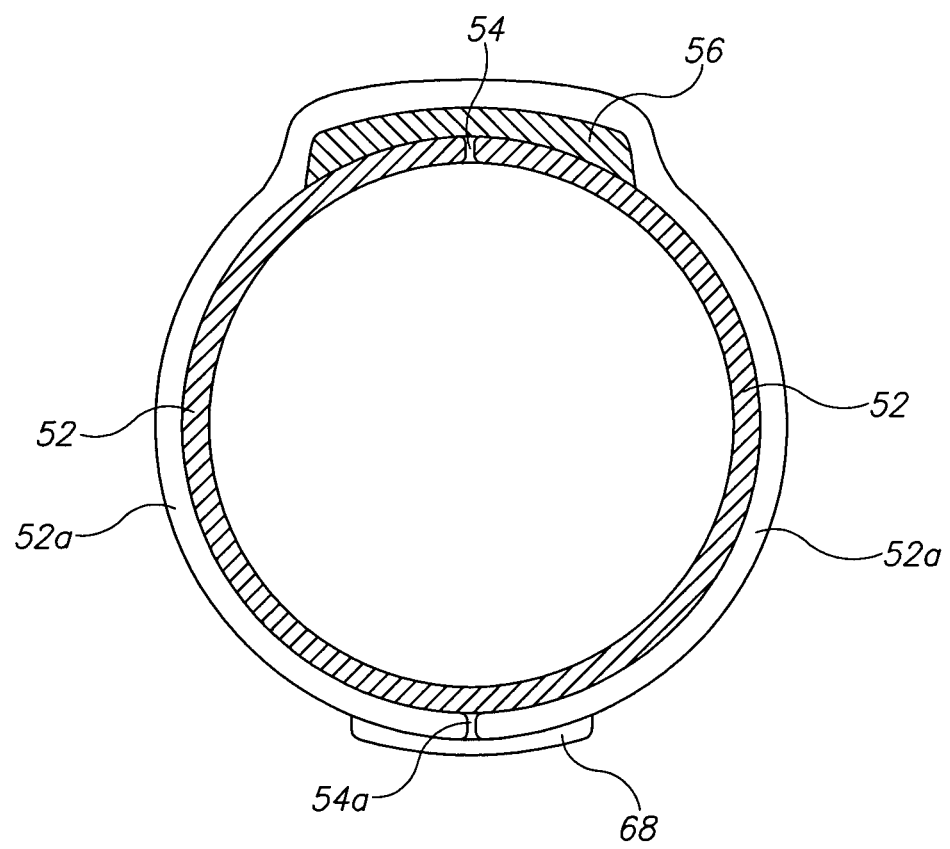
FIG. 5 is a cross sectional view of the case shown in FIG. 4, along line A-A.

FIG. 5 is across sectional view of the IM casing shown in FIG. 2. A first layer of tape 52 is cut 54 to make it discontinuous. And a patch 56 is placed over the cut 54. A second layer of tape 52a covers the first layer 52 and patch 56. This layer 52a is cut 54a and a patch 68 is placed over the cut 54a, thus providing two discontinuous layers of tape, 52 and 52a.

After the casing is completely wound it is cured to harden the reinforcing tapes, overlaps and patches. It is understood that not all the windings have to be cut and made discontinuous, just enough of them so that when the adhesive of the overlap portion or patch softens or melts at their breakdown temperature below the auto-ignition temperature of a housed propellant the loss of adhesion between tapes and overlap or patch allows the tape sections to separate and enable release of the pressure in the case before reaching the auto-ignition temperature.

Preferably, a suitable length of overlap and suitable adhesive is chosen so that the overlapping portion has strength close to that of the uncut filament.

Thus, the casing is as strong under normal conditions as it would otherwise be without the discontinuities. The munitions can be put in the casing prior or after curing.

The shape of the casing is defined by a shaped body or mandrel upon which the filament or tape is wound. This shape may be cylindrical, conical or any variety of shapes.

In prior art casings, the fibers, tapes or sheets are typically continuous, with only the terminal end overlapping. In contrast, because the IM casing of the present invention has multiple discontinuities it allows much greater flexibility in design and control of the parameters of the IM.

It should be understood that the above description is merely exemplary and that there are various embodiments of the present invention that may be devised.

The invention claimed is:

1. An insensitive munitions casing for housing a propellant charge comprising:

a reinforcing material having a plurality of wound reinforcing layers forming a casing, at least some of said plurality of wound reinforcing layers being cut to define a discontinuous section in the casing;

an adhesive bonding material coating said reinforcing material and forming a bond with said casing;

a patch covering said discontinuous section and secured to said casing with a patch adhesive bonding material to form a patch bond with said casing;

wherein said patch adhesive bonding material has a bond-strength breakdown temperature which is below an auto-ignition temperature of the propellant charge to be housed in said casing such that said patch bond will fail at said bond-strength breakdown temperature causing said casing to separate at said discontinuous section, thereby enabling release of propellant charge pressurization.

2. The insensitive munitions casing of claim 1 wherein said reinforcing material is selected from the group consisting of reinforcing fibers, reinforcing tape, reinforcing sheet material and combinations thereof.

3. The insensitive munitions casing of claim 2, wherein said reinforcing material is a pre-preg reinforcing fiber selected from the group consisting of thermoplastic, thermosetting adhesives and combinations thereof.

4. The insensitive munitions casing of claim 2 wherein said reinforcing material includes a plurality of wound reinforcing layers forming a wound casing.

5. The insensitive munitions casing of claim 4 wherein said wound casing comprises a fiber-wound casing.

6. The insensitive munitions casing of claim 4 wherein said wound casing comprises a tape-wound casing.

7. The insensitive munitions casing of claim 2 wherein said reinforcing material includes a plurality of wrapped reinforcing layers forming a wrapped casing.

8. The insensitive munitions casing of claim 2 wherein said reinforcing material includes a plurality of rolled reinforcing layers forming a rolled casing.

9. The insensitive munitions casing of claim 1 wherein said at least some of said plurality of reinforcing layers are cut to form multiple discontinuous sections in said casing, and wherein at least one patch covers said multiple discontinuous sections.

10. The insensitive munitions casing of claim 1, wherein said at least some of said plurality of reinforcing layers are cut to form multiple discontinuous sections in said casing, and wherein at least a portion of said reinforcing material defines an overlap over at least some of said multiple discontinuous interfaces.

11. The insensitive munitions casing of claim 1 wherein said at least some of said plurality of reinforcing layers are cut to form multiple discontinuous sections, and at least one patch covers said multiple discontinuous sections.

12. The insensitive munitions casing of claim 11, further comprising multiple patches, each patch covering at least one of said multiple discontinuous sections.

13. An insensitive munitions casing, such as a composite motor case, for housing a propellant charge, said casing comprising:

a reinforcing material wound respectively, to form a composite case having a number of overlapping reinforcing layers, the reinforcing material being coated with an adhesive bonding material for bonding the reinforcing material to itself for constructing and maintaining the configuration of the composite case;

at least some of the wound reinforcing material being cut to form a discontinuous section therein;

a patch covering the discontinuous section and secured to the composite case with a patch adhesive bond material to form a patch bond;

wherein the patch adhesive bond material has a bond-strength breakdown temperature which is below the auto-ignition temperature of a housed propellant;

wherein the patch covering the discontinuous section separates from the composite case once the bond-strength breakdown temperature of the patch adhesive bonding material is reached, thereby causing the patch bond to fail at the discontinuous section for releasing internal pressure in the casing at a pre-selected location and preventing unwanted propellant pressurization within the casing.

14. The insensitive munitions casing of claim 13, wherein said wound reinforcing material is a pre-impregnated reinforcing fiber selected from the group consisting of thermoplastic, thermosetting adhesives and combinations thereof.

15. The insensitive munitions casing of claim 13, wherein the casing comprises a tape-wound casing.

16. The insensitive munitions casing of claim 13 prepared by a process comprising:

winding the reinforcing material coated with the adhesive bonding material around a mandrel to form at least one layer of the composite case;

cutting a pre-selected section of the reinforcing material to form the discontinuous section;

securing the patch to the composite case over the discontinuous section with the patch adhesive bond material; and curing the composite case.

\* \* \* \* \*